United States Patent
BenHanokh et al.

(10) Patent No.: US 11,782,637 B2
(45) Date of Patent: Oct. 10, 2023

(54) PREFETCHING METADATA IN A STORAGE SYSTEM

(71) Applicant: RED HAT, INC., Raleigh, NC (US)

(72) Inventors: Gabriel Zvi BenHanokh, Tel-Aviv (IL); Joshua Durgin, Canyon Country, CA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/141,750

(22) Filed: Jan. 5, 2021

(65) Prior Publication Data

US 2022/0214832 A1 Jul. 7, 2022

(51) Int. Cl.
*G06F 12/08* (2016.01)
*G06F 12/0808* (2016.01)
*G06F 12/0815* (2016.01)
*G06F 3/06* (2006.01)

(52) U.S. Cl.
CPC ............ *G06F 3/0659* (2013.01); *G06F 3/067* (2013.01); *G06F 3/0611* (2013.01); *G06F 3/0653* (2013.01)

(58) Field of Classification Search
CPC ...... G06F 13/1652; G06F 21/55; G06F 13/16; G06F 12/1081; G06F 9/5066
USPC ......................................................... 711/154
See application file for complete search history.

(56) References Cited

U.S. PATENT DOCUMENTS

| | | | |
|---|---|---|---|
| 7,624,091 B2 | 11/2009 | Enko | |
| 7,873,791 B1 | 1/2011 | Yu | |
| 8,738,861 B2 | 5/2014 | Bao et al. | |
| 9,881,014 B1* | 1/2018 | Bono | G06F 3/065 |
| 10,223,270 B1 | 3/2019 | Audenaert et al. | |
| 10,235,066 B1* | 3/2019 | Chen | G06F 3/0619 |
| 10,409,800 B2* | 9/2019 | Schaub | G06F 16/2322 |
| 10,609,174 B2 | 3/2020 | Devaraju et al. | |
| 10,719,410 B2* | 7/2020 | Bronk | H04W 12/033 |
| 10,834,057 B1* | 11/2020 | Ferguson | H04L 63/0263 |
| 11,157,177 B2* | 10/2021 | Gazit | G06F 3/067 |
| 2004/0078533 A1* | 4/2004 | Lee | G06F 11/1456 714/E11.12 |
| 2004/0158566 A1* | 8/2004 | Chong, Jr. | G06F 11/1466 |

(Continued)

FOREIGN PATENT DOCUMENTS

| CN | 103984640 B | 6/2017 |
|---|---|---|
| CN | 110109889 A | 8/2019 |

OTHER PUBLICATIONS

Lin, L., et al., "AMP: An Affinity-based Metadata Prefetching Scheme in Large-Scale Distributed Storage Systems," Eighth IEEE International Symposium on Cluster Computing and the Grid, 2008, https://ieeexplore.ieee.org/abstract/document/4534250.

*Primary Examiner* — Mohamed M Gebril
(74) *Attorney, Agent, or Firm* — Kilpatrick Townsend & Stockton LLP

(57) ABSTRACT

Aspects and features of the present disclosure can prefetch metadata in the nodes of a cloud-based storage system. At a node that stores at least one shard of a data object, metadata for the data object can be fetched from node storage and saved in a node cache prior to processing a read request for the shard. The metadata can be cached in response to a prefetch request transmitted to the node, for example, by the gateway that shards data objects for the storage system. Thus, the metadata can be available in the node cache when the read request for the data shard arrives later, reducing delays in accessing data object shards from the storage nodes of the system.

20 Claims, 4 Drawing Sheets

(56) References Cited

U.S. PATENT DOCUMENTS

| | | | | |
|---|---|---|---|---|
| 2010/0100666 | A1* | 4/2010 | Min | G06F 3/0679 |
| | | | | 711/E12.001 |
| 2010/0321647 | A1* | 12/2010 | Schuler | G06F 1/3265 |
| | | | | 715/764 |
| 2011/0264843 | A1* | 10/2011 | Haines | G06F 3/0679 |
| | | | | 711/170 |
| 2013/0086317 | A1* | 4/2013 | Nakano | G06F 3/0613 |
| | | | | 711/E12.019 |
| 2014/0006465 | A1* | 1/2014 | Davis | G06F 16/1752 |
| | | | | 707/827 |
| 2015/0199367 | A1* | 7/2015 | Hammer | G06F 16/1748 |
| | | | | 707/654 |
| 2015/0249632 | A1* | 9/2015 | Barrand | H04W 4/022 |
| | | | | 709/206 |
| 2016/0026504 | A1* | 1/2016 | Finnigan | G06F 9/4881 |
| | | | | 718/105 |
| 2016/0062900 | A1* | 3/2016 | Liu | G06F 16/172 |
| | | | | 711/125 |
| 2016/0283672 | A1* | 9/2016 | Self | G16H 40/20 |
| 2017/0017413 | A1* | 1/2017 | Aston | G06F 3/0643 |
| 2017/0220777 | A1* | 8/2017 | Wang | G06F 21/6218 |
| 2017/0315878 | A1* | 11/2017 | Purohit | G06F 16/24573 |
| 2018/0217926 | A1* | 8/2018 | Ogawa | G06F 3/0679 |
| 2019/0294715 | A1* | 9/2019 | Gupta | G06F 16/17 |
| 2020/0026653 | A1* | 1/2020 | Shveidel | G06F 12/0868 |
| 2020/0034049 | A1* | 1/2020 | Bhattacharyya | G06F 3/0673 |
| 2020/0349110 | A1* | 11/2020 | Shveidel | G06F 16/128 |
| 2021/0081432 | A1* | 3/2021 | Grunwald | G06F 16/273 |
| 2021/0182214 | A1* | 6/2021 | Moyer | G06F 12/0897 |
| 2021/0216531 | A1* | 7/2021 | Shveidel | G06F 16/2365 |
| 2022/0221992 | A1* | 7/2022 | Shveidel | G06F 3/0653 |

* cited by examiner

PREFETCHING METADATA IN A STORAGE SYSTEM

TECHNICAL FIELD

The present disclosure relates generally to cloud storage systems. More specifically, but not by way of limitation, this disclosure relates to improving the read performance for large data objects stored in such storage systems.

BACKGROUND

Large scale, cloud-based storage systems can be used to store large data objects. A storage system can include many nodes, and each node can include one or more storage devices and computing hardware to manage reading from and writing to the storage devices. Because large data objects can be gigabytes in size, and a typical storage system can store billions of objects, most node storage devices include hardware that can handle large amounts of data at a reasonable cost. Examples of such hardware can include fixed magnetic disks, or some other form of fixed, relatively long term storage.

In a cloud-based storage system, data objects can be frequently written to and read from node storage, which can result in the amount of free space at any given node varying as the system operates. Storage systems can be configured with a size limit for items stored in a node to provide reasonable access times for reads and writes. Such a storage systems typically include one or more entities that perform data sharding for the system. Data sharding is a partitioning strategy that divides large data objects into smaller parts that are shards, and that stores the shards in different physical nodes of the storage system. Nodes can also store metadata that describes the data object and how the data object is stored.

DETAILED DESCRIPTION

Figure 1:
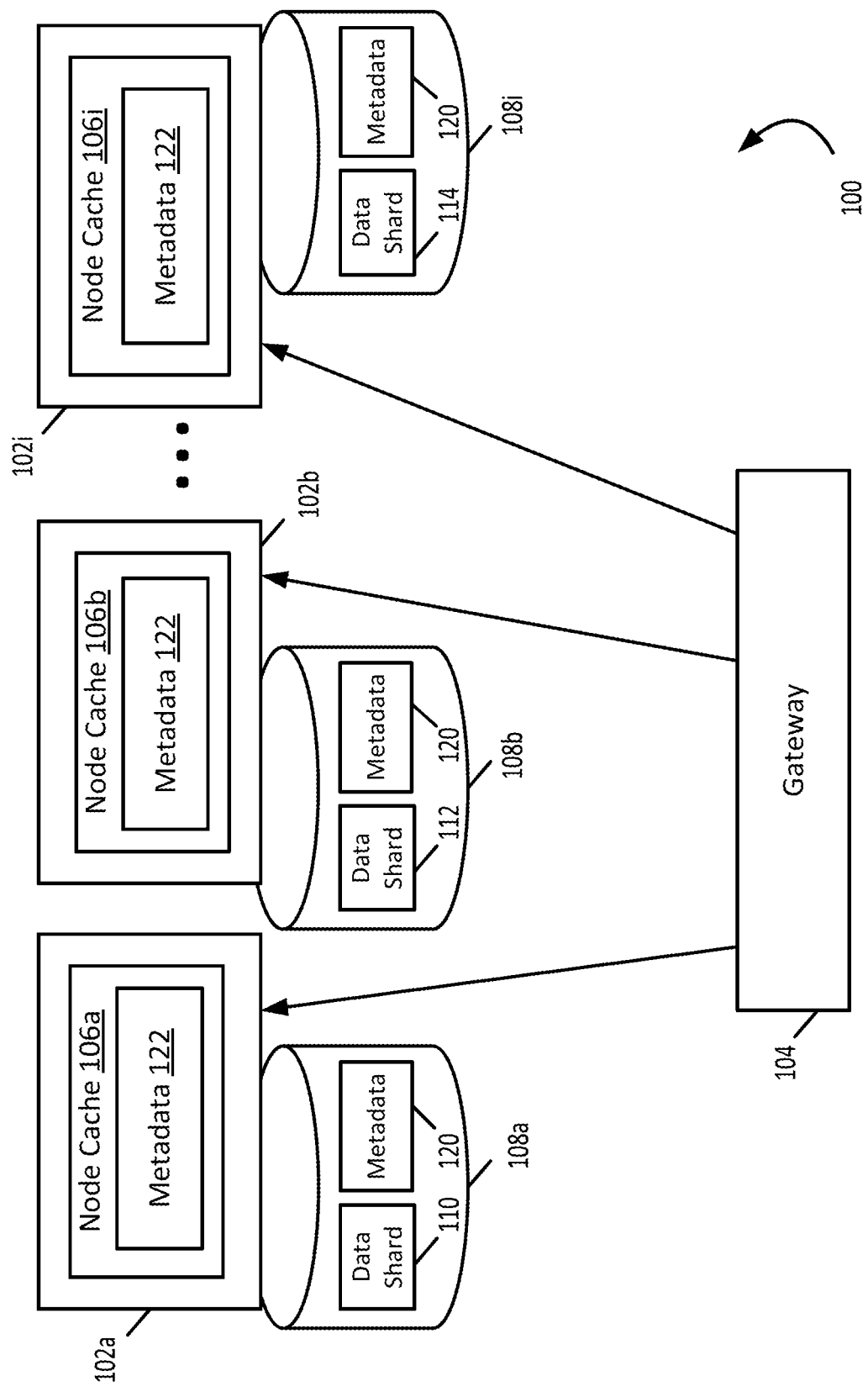
FIG. 1 is a block diagram of an example of a system for prefetching metadata for data objects according to at least some aspects of the disclosure.

As a cloud-based storage system operates, large data objects can be split into shards, which can be transmitting to multiple nodes for storing the shards. Each time a node receives a read-request for a shard, the computing hardware in the node can fetch a metadata object from storage to service the read-request. While the metadata object may be small in size, reading the metadata object can cause significant delay because the node determines where in storage the metadata resides, which may take multiple input/output (I/O) operations. Additionally, multiple reads may be used to obtain and assemble the metadata. Thus, reading and assembling the metadata object to service a shard read request can cause a significant delay in reading the shard of data that is used to assemble and produce the corresponding data object.

Some examples of the present disclosure overcome one or more of the issues mentioned above through metadata prefetching that can result in computing systems, such as cloud computing systems, managing and accessing data faster. At a node that stores at least one shard of a data object, metadata for the data object can be fetched from node storage and saved in a node cache prior to receiving a read request for the shard. The metadata can be cached in response to a prefetch request transmitted in advance of a data read to the node by the client-host requesting the object and which has visibility into the sharding used by the storage system. The metadata can be available from the node cache when the read request for the data shard is subsequently received, and can be read more quickly if the metadata is retrieved from the fixed node storage device prior to the read request being received.

In some examples, the prefetch request can be prioritized by a node to more efficiently use the node cache for the metadata. For example, the prefetch request can include an estimate for a point of time in the future at which the relevant shard is to be used. The estimate can be used by the node to prioritize metadata prefetch requests that the node receives. A node can also prioritize prefetch requests stored in the node cache, based on an expiration time for the prefetch request's use of the node cache.

In some example, prefetching the metadata for a data object moves the metadata from a fixed node storage device into the node cache prior to receiving a read request for a shard or shards of the data object stored at the node. The node cache may reside in a memory device with better read performance than that of the fixed node storage device. The metadata can be read and acted on by a processor device at the node more quickly than might be possible if the metadata were to be read from the fixed node storage device after the read request for a shard or shards of the data object is received at the node. A data shard can then be retrieved and transmitted sooner in response to the read request than might be possible if the metadata had not been moved to the node cache in advance.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for prefetching metadata for large data objects according to at least some aspects of the disclosure. In this example, the cloud-based storage system 100 includes a gateway and storage nodes, which are communicatively coupled with the gateway using cloud resources. System 100 includes multiple storage nodes: for example, nodes 102*a*, 102*b*, and others, through node 102*i*. A computing device, such as one operating any of the nodes, can execute software, which can cause the computing device to perform tasks, such as storing, in one or more nodes, a shard or shards of a data object and metadata describing the data object, and receiving a metadata prefetch request from gateway 104. The computing device can also read the metadata into a node cache in response to receiving the metadata prefetch request. The computing device can transmit one or more data shards of the data object using the metadata from the node cache to access the shards quickly so that the gateway 104 can reassemble the data object.

Each node of storage system 100 includes a node cache and a storage system. For example, nodes 102a and 102b-102i include node caches 106a and 106b-106i and include storage devices 108a and 108b-108i, respectively. Each storage device shown in FIG. 1 includes a shard of a data object stored in storage system 100 for a user of the storage system. For example, data shard 110 is stored in storage device 108a, data shard 112 is stored in storage device 108b, and data shard 114 is stored in storage device 108i. Each storage device includes a stored copy 120 of the metadata for the data object that has been sharded. The metadata can be produced and transmitted to the nodes by gateway 104. A computing device can operate gateway 104 and can execute software, which causes the gateway 104 to perform tasks, such as sharding the data object, transmitting the shards, and producing and transmitting the metadata. The gateway 104 can also produce a time-to-read (TTR) estimate for the metadata. In some examples, the gateway 104 resides in a middleware layer of a cloud computing system.

Node caches 106a and 106b-106i can be used to cache copies 122 of the metadata for the data object that is sharded by the gateway 104. The copies 122 of the metadata can be read into the node caches in response to a metadata prefetch request transmitted to the nodes by gateway 104. Optionally, a data shard, or a portion of a data shard, can be stored in the node cache if sufficient space is available. Storage system 100 may include any number of nodes, including more nodes than those depicted in FIG. 1. When storing a data object, shards may not be stored in every node of the system as some nodes may not have adequate storage availability at any given time, or the storage space requirement given the size of the data object is modest relative to the capacity of the storage system. In the example of FIG. 1, metadata is only stored in nodes where shards are stored, and gateway 104 sends the metadata to nodes being used to store shards for the data object of interest.

Figure 2:
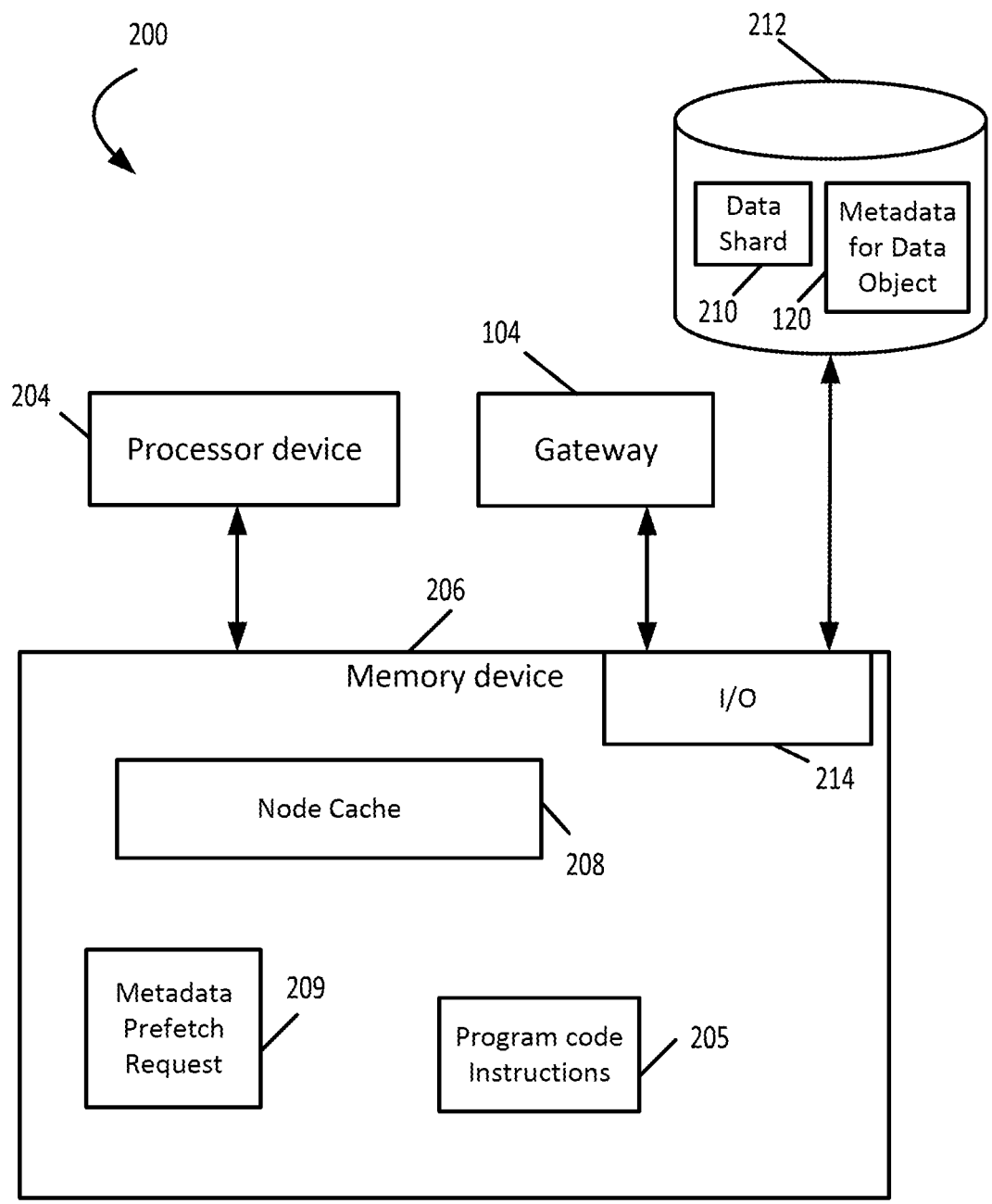
FIG. 2 is a block diagram of another example of a system for prefetching metadata for data objects according to some aspects of the disclosure.

FIG. 2 is a block diagram of another example of a system for prefetching metadata for large data objects according to at least some aspects of the disclosure. The system 200 includes processor device 204. Processor device 204 can execute computer program code, also referred to as instructions or program code instructions 205, for performing operations related to storing a shard 210 of a data object and a copy 120 of metadata describing the data object, and receiving a metadata prefetch request 209 from gateway 104. The processor device can also read the metadata into a node cache 208 in response to receiving the metadata prefetch request 209, and provide the shard 210 of the data object to the gateway 104 so that the gateway can reassemble the data object when a user requests the data object from the storage system.

Processor device 204 is communicatively coupled to the memory device 206. The processor device 204 can include one processor device or multiple processor devices. Non-limiting examples of the processor device 204 can include a field-programmable gate array (FPGA), an application-specific integrated circuit (ASIC), a microprocessor, etc. The processor device 204 can execute one or more operations for running program code instructions 205, which can be stored in the memory device 206. Computer program code instructions 205 can include executable instructions to store data shard 210 and a copy 120 of metadata in node storage device 212.

Memory device 206 can include one memory device or multiple memory devices. The memory device 206 can be non-volatile and may include any type of memory device that retains stored information when powered off. In some examples, at least some of the memory device can include a non-transitory computer-readable medium from which the processor device 204 can read instructions 205. A computer-readable medium can include electronic, optical, magnetic, or other storage devices capable of providing the processor device with computer-readable instructions 205 or other program code. Non-limiting examples of the memory device 206 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

Memory device 214 also includes an input/output (I/O) module or modules 214, and can include a bus or interconnect (not shown) to allow for inter- and intra-device communications. I/O module 214 can include a network interface (not shown), which in turn can communicate with gateway 104. I/O module 214 can also interface with storage device 212.

Gateway 104 can include a processor device (not shown) similar or identical to processor device 204 and a memory device (not shown) similar or identical to memory device 206. The processor device in gateway 104 can execute computer program code, also referred to as instructions or program code instructions, stored in the memory device in gateway 104 for performing operations related to sharding the data object and transmitting the shards, as well as operations related to producing and transmitting the metadata. The computer program code in gateway 104 can also produce TTR estimates, which can be used to prioritize writing metadata to and reading metadata from node cache 208. Although FIGS. 1 and 2 depict a certain arrangement of components for illustrative purposes, other examples can include any number and combination of these components arranged in any suitable configuration.

Figure 3:
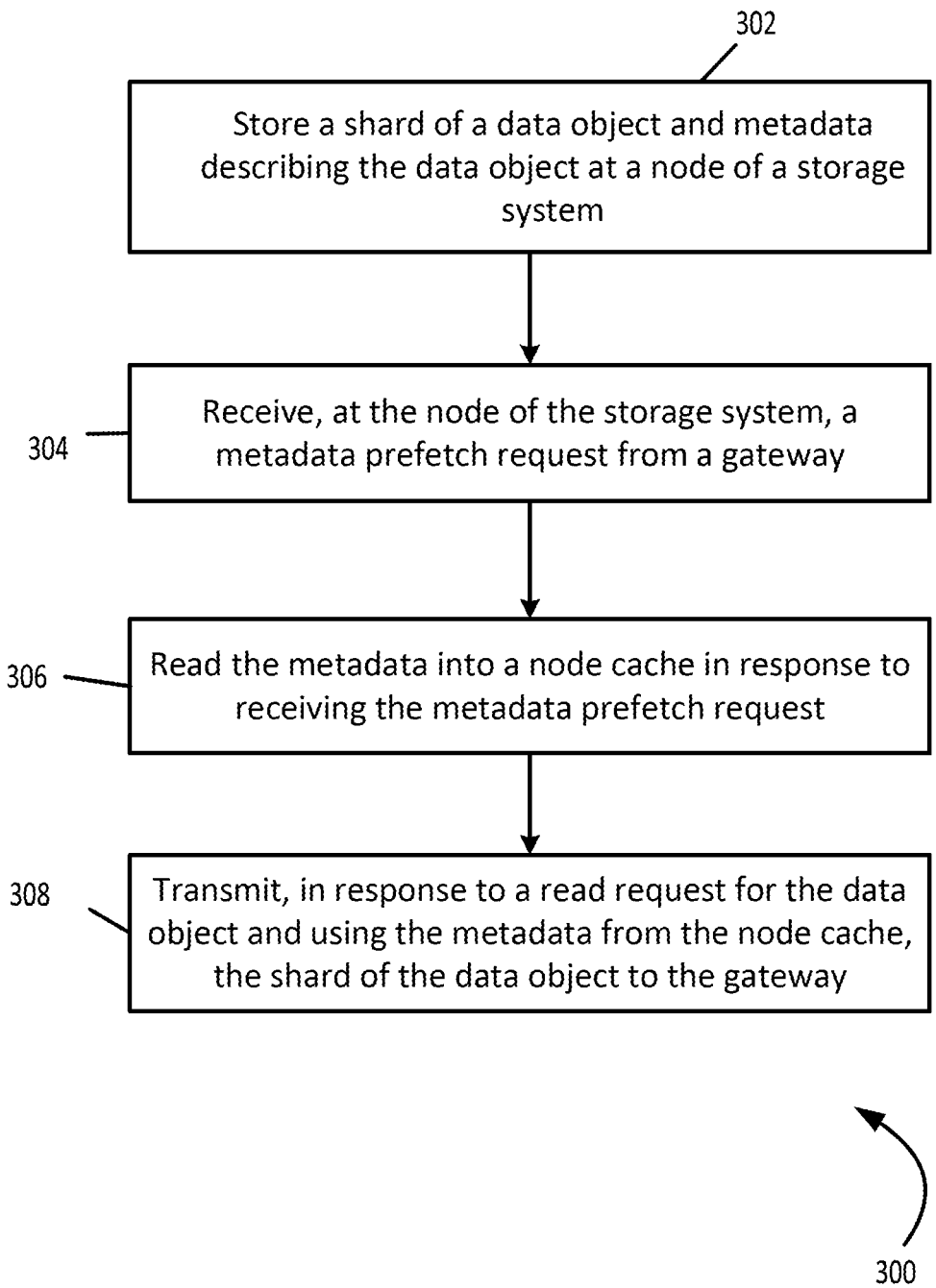
FIG. 3 is a flowchart of an example of a process for prefetching metadata for data objects according to some aspects of the disclosure.

In some examples, a computing device such as processor device 204 can perform one or more of the operations shown in FIG. 3 to prefetch metadata for data objects according to at least some aspects of the disclosure. In other examples, the processor device can implement more operations, fewer operations, different operations, or a different order of the operations depicted in FIG. 3. Process 300 of FIG. 3 is described below with reference to components discussed above.

At block 302 of process 300, processor device 204 can store a shard of a data object and metadata describing the data object at a node of the storage system. At block 304, the node can receive a metadata prefetch request from gateway 104. At block 306, the node can read the metadata into the node cache in response to receiving the metadata prefetch request. At block 308, in response to a read request for the data object, the node can transmit the shard of the data object to gateway 104 using the metadata from the node cache. The read request, as an example, may be received at the gateway from a user of the storage system.

Figure 4:
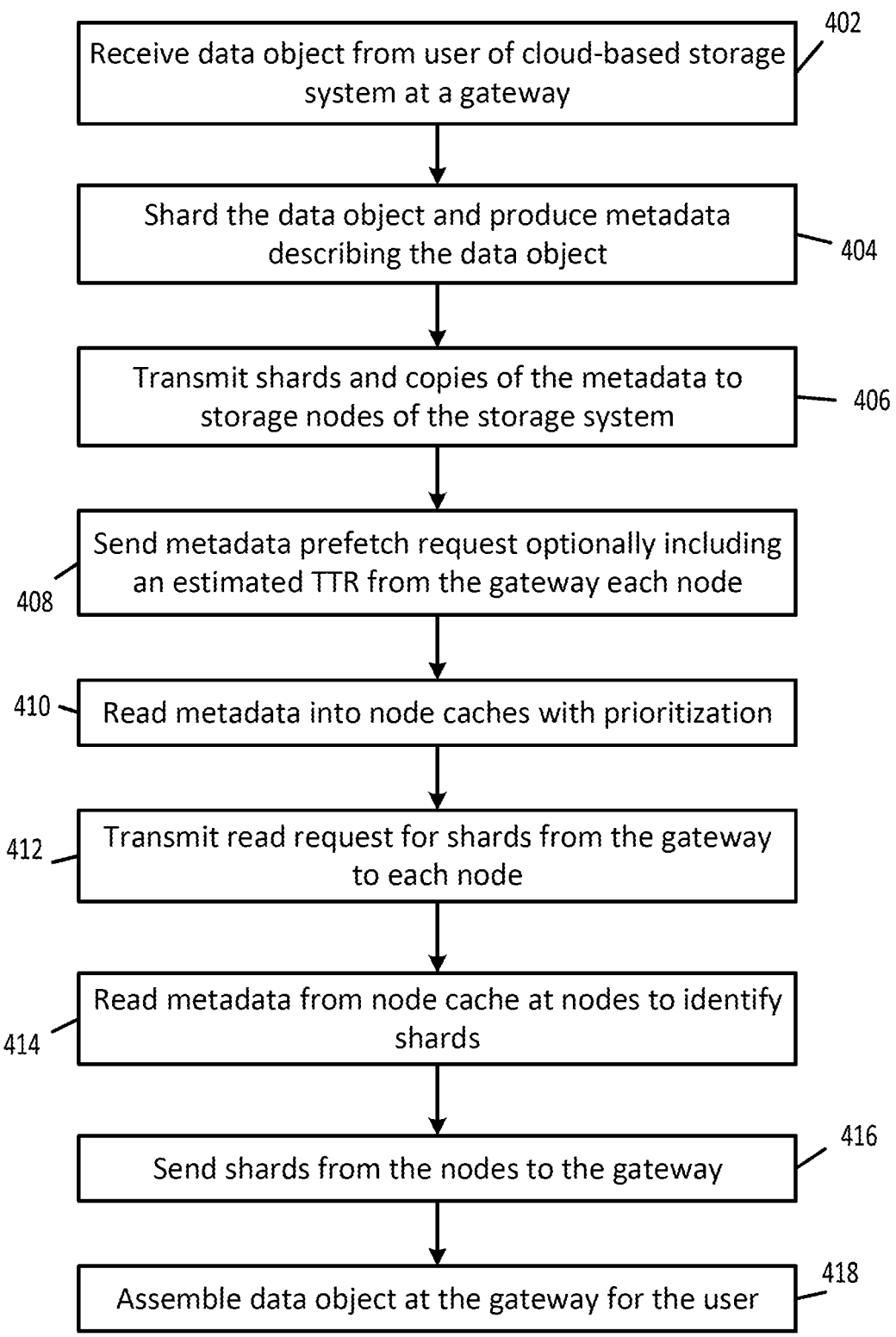
FIG. 4 is a flowchart of an example of another process for prefetching metadata for data objects according to some aspects of the disclosure.

In some examples, a computing device such as processor device 204 can perform one or more of the operations shown in FIG. 4 to prefetch metadata for large data objects according to at least some aspects of the disclosure. In other examples, the processor device can implement more operations, fewer operations, different operations, or a different order of the operations depicted in FIG. 4.

At block 402 of process 400, a data object can be received at gateway 104 from a user of the storage system. At block 404, the gateway can shard the data object and produce the metadata describing the data object. At block 406, the gateway can transmit the shards of the data object and copies of the metadata to storage nodes of the system. The gateway can keep track of which nodes store the data object and where the shards of the data object reside. Thus, for the rest of the description of process 400, the nodes referred to are the nodes that store shards of the data object involved in the process. The storage system may include many other nodes.

At block 408 of process 400, the metadata prefetch request can be assembled by gateway 104 and sent to each node. The request optionally includes the estimated TTR. For example, the estimated TTR may be included when the data object is especially large, such as when the data object is several hundred MB in size where the storage platform has a data object size limit of 5 GB. The gateway can send the metadata prefetch request shortly before it expects to request a shard of data from the node. If the system receives a read request for the data object from a user, the gateway can send the metadata prefetch request to the nodes in response. The gateway can request shards as it can use them to sequentially reassemble the data object, so that some shards will be read later than other shards. The TTR for each shard stored at a node can be predicted based on the gateway's projected need for each shard.

The metadata can then be available in the node cache when the read request for the shard arrives later. The gateway may also optionally include analytics regarding usage of the storage system. These analytics can be used to predict shard read requests. If any prediction does not pan out, cached metadata can expire in accordance with normal cache expiration policies.

At block 410, each node can read the metadata into its node cache, possibly prioritizing metadata prefetch requests. A metadata prefetch request can be prioritized among multiple metadata prefetch requests for various data objects for which a node is storing shards. If gateway 104 has included an estimated TTR in its metadata prefetch requests, metadata can be cached at the nodes using the estimated TTR for prioritization. Otherwise, prioritization may be based on the expiration time for the metadata in the cache so that cached metadata does not expire prior to being needed. When the estimated TTR is used, the read times for the first shards needed can be a few milliseconds in the future, whereas the read times for the last shards needed can be as much as a few full seconds in the future. A priority level can be assigned to a metadata prefetch request so that reading metadata into the cache can be prioritized for a given metadata prefetch request from among multiple metadata prefetch requests of varying priority levels. A node can prioritize reading metadata into the cache based on estimated TTR values so that the metadata objects the node needs sooner can be read into the cache sooner and expire sooner in order to maintain enough space in the node cache. Metadata remaining in the cache after corresponding shards are read from the node can be deleted or left to expire under cache expiration policies At block 412 of process 400, read requests for shards can be transmitted from the gateway to each node. The read requests for the shards can be transmitted in response to a read request for the data object received at the gateway. At block 414, the nodes can read metadata from the node caches to quickly identify and access the shards that correspond to the read request. At block 416, the shards of the data object can be transmitted from the nodes to the gateway. At block 418, gateway 104 can assemble the data object for the user of the storage system.

In some examples, a node can read metadata corresponding to multiple metadata prefetch requests into the node cache of from the node cache substantially simultaneously. For example, the node can be configured to combine metadata reads into the cache or from the cache into a single I/O operation as the node acquires information about reads in the near future. Such a configuration can be used, as examples, when the gateway is a reliable autonomic distributed object store gateway (RGW), for large Ceph™ file system files, or for data from a full backup of a reliable autonomic distributed object store gateway block device (RBD).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processor device; and
at least one memory device including instructions that are executable by the processor device for causing the processor device to perform operations comprising:
storing, in a node storage device among a plurality of node storage devices of a storage system including a plurality of nodes, a shard of a data object, the shard configured to reassemble, from a plurality of shards, the data object at a gateway of the storage system in response to a user request for the data object;
tracking, at the gateway, which nodes of the plurality of nodes store the data object and locations of the plurality of shards of the data object;
receiving, at a node of the plurality of nodes, from the gateway using cloud resources, a metadata prefetch request sent in response to the user request, the metadata prefetch request corresponding to the shard of the data object and to metadata configured to service a read request for the shard, the metadata prefetch request including a time-to-read (TTR) estimate for a projected time at which the shard will be needed;
prioritizing the metadata prefetch request among multiple metadata prefetch requests corresponding to various data objects for which the node is storing shards;
moving the metadata from the node storage device into a node cache in response to receiving the metadata prefetch request; and
transmitting, in response to the read request and using the metadata from the node cache, the shard for use in reassembling the data object.

2. The system of claim 1, wherein the operations further comprise assigning a priority level to the metadata prefetch request from among priority levels for the multiple metadata prefetch requests based in part on a cache expiration policy.

3. The system of claim 2, wherein the operation of assigning the priority level to the metadata prefetch request further comprises assigning the priority level based on an expiration time for the metadata prefetch request.

4. The system of claim 2, wherein the TTR estimate is based on usage analytics for the storage system, and wherein the operation of assigning the priority level to the metadata prefetch request further comprises assigning the priority level based on the TTR estimate.

5. The system of claim 1, wherein the operation of moving the metadata from the node storage device into the node cache further comprises executing an input/output operation configured to move metadata corresponding to a plurality of metadata prefetch requests into the node cache substantially simultaneously.

6. The system of claim 1, wherein the operations further comprise:
   sharding the data object at a gateway; and
   producing, by the gateway, the TTR estimate based on usage analytics for the storage system.

7. The system of claim 1, wherein the operations further comprise reading at least a portion of the shard of the data object into the node cache, wherein the operation of transmitting the shard of the data object includes reading the at least a portion of the shard of the data object from the node cache.

8. A method comprising:
   storing, in a node storage device among a plurality of node storage devices of a storage system including a plurality of nodes, a shard of a data object and metadata configured to service a read request corresponding to the shard as stored at the node, the shard configured for reassembling, from a plurality of shards, the data object at a gateway of the storage system in response to a user request for the data object, the node including a processor device executing code stored on a non-transitory computer-readable medium, wherein the gateway is configured to track which nodes of the plurality of nodes store the data object and locations of the plurality of shards of the data object;
   receiving, by the node, from the gateway using cloud resources, a metadata prefetch request sent by the gateway in response to the user request, the metadata prefetch request including a time-to-read (TTR) estimate for a projected time at which the shard will be needed;
   prioritizing the metadata prefetch request among multiple metadata prefetch requests corresponding to various data objects for which the node is storing shards;
   moving, by the node, the metadata from the node storage device into a node cache in response to receiving the metadata prefetch request; and
   transmitting, by the node using the cloud resources, in response to the read request and using the metadata from the node cache, the shard of the data object to the gateway for reassembling the data object.

9. The method of claim 8, further comprising assigning a priority level to the metadata prefetch request from among priority levels for the multiple metadata prefetch requests based in part on a cache expiration policy.

10. The method of claim 9, wherein assigning the priority level to the metadata prefetch request further comprises assigning the priority level based on an expiration time for the metadata prefetch request.

11. The method of claim 9, wherein the TTR estimate is based on usage analytics for the storage system, and wherein assigning the priority level to the metadata prefetch request further comprises assigning the priority level based on the TTR estimate.

12. The method of claim 8, wherein moving the metadata from the node storage device into the node cache further comprises executing an input/output operation to move metadata corresponding to a plurality of metadata prefetch requests into the node cache substantially simultaneously.

13. The method of claim 8, further comprising:
   sharding the data object at the gateway; and
   producing, by the gateway, the TTR estimate based on usage analytics for the storage system.

14. The method of claim 8 further comprising reading at least a portion of the shard of the data object into the node cache, wherein transmitting the shard of the data object includes reading the at least a portion of the shard of the data object from the node cache.

15. A non-transitory computer-readable medium comprising program code that is executable by a processor device for causing the processor device to:
   shard a data object at a gateway of a storage system to strategically divide the data object into a plurality of shards configured to be stored in a plurality of storage devices among a plurality of nodes of the storage system;
   transmit, using cloud resources, a shard from among the plurality of shards of the data object and metadata from the gateway to a node of the plurality of nodes of the storage system, the metadata configured to service a read request corresponding to the shard as stored in a node storage device at the node;
   track, at the gateway, which nodes of the plurality of nodes store the data object and locations of the plurality of shards of the data object;
   determine a projected need for the shard of the data object to reassemble the data object at the gateway in response to a user request for the data object; and
   transmit, using the cloud resources, in response to the user request for the data object, a metadata prefetch request from the gateway to the node of the storage system based on the projected need for the shard of the data object, the metadata prefetch request configured for prioritization among multiple metadata prefetch requests corresponding to various data objects for which the node is storing shards, and including a time-to-read (TTR) estimate for a projected time at which the shard will be needed and configured to cause the node of the storage system to move the metadata from the node storage device into a node cache.

16. The non-transitory computer-readable medium of claim 15, wherein the program code is executable for causing the processor device to:
   transmit the read request to the node of the storage system for the shard of the data object;
   receive the shard of the data object from the node of the storage system at the gateway; and
   reassemble the data object using the shard of the data object.

17. The non-transitory computer-readable medium of claim 15, wherein the program code is executable for causing the processor device to configure the TTR estimate for assigning a priority level to the metadata prefetch request based in part on a cache expiration policy.

18. The non-transitory computer-readable medium of claim 17, wherein the program code executable for causing the processor device to determine the projected need for the shard of the data object based on usage analytics for the storage system.

19. The non-transitory computer-readable medium of claim 18, wherein the program code executable for causing the processor device to receive the user request for the data object at the gateway.

20. The non-transitory computer-readable medium of claim 15, wherein the program code is executable for causing the processor device to move the metadata into the node cache at the node in response to receiving the metadata prefetch request from the gateway.

* * * * *